(12) United States Patent
Hsu et al.

(10) Patent No.: US 8,982,975 B2
(45) Date of Patent: Mar. 17, 2015

(54) METHOD FOR SIGNAL ESTIMATION AND COMPENSATION AND APPARATUS USING THE SAME

(71) Applicant: Acer Incorporated, New Taipei (TW)

(72) Inventors: Terng-Yin Hsu, Hsinchu (TW); Wei-Chi Lai, Hsinchu (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/011,771

(22) Filed: Aug. 28, 2013

(65) Prior Publication Data
US 2014/0355722 A1 Dec. 4, 2014

(30) Foreign Application Priority Data
May 28, 2013 (TW) .............................. 102118787 A (51) Int. Cl.
*H04B 1/00* (2006.01)
*H04L 27/14* (2006.01)
(52) U.S. Cl.
CPC ...................................... *H04L 27/14* (2013.01)
USPC ......................................................... 375/260
(58) Field of Classification Search
CPC ................. H04B 17/0015; H04B 2201/70727; H04L 27/06; H04L 27/22; H04L 27/265; H04L 27/2652; H04L 27/2653; H04L 27/2666; H04L 27/2671; H04L 27/2672
USPC ......... 375/260, 261, 262, 265, 279, 281, 320, 375/324, 329, 332, 340, 341; 370/208, 210; 455/42, 205, 210, 334, 337
See application file for complete search history.

(56) References Cited

U.S. PATENT DOCUMENTS

| | | | |
|---|---|---|---|
| 6,801,586 B1* | 10/2004 | Imamura | 375/340 |
| 2007/0201349 A1* | 8/2007 | McCoy | 370/208 |
| 2010/0220825 A1* | 9/2010 | Dubuc et al. | 375/346 |

OTHER PUBLICATIONS

Rao et al., "I/Q Mismatch Cancellation for MIMO-OFDM Systems," 15th IEEE International Symposium on Personal, Indoor and Mobile Radio Communications 4, Sep. 5-8, 2004, pp. 2710-2714.
Lin et al., "Implementation of Digital IQ Imbalance Compensation in OFDM WLAN Receivers," Proceedings of IEEE International Symposium on Circuits and Systems (ISCAS), May 21-24, 2006, pp. 3534-3537.
Tarighat et al., "MIMO OFDM Receivers for Systems With IQ Imbalances," IEEE Transactions on Signal Processing 53 (9), Sep. 2005, pp. 3583-3596.

(Continued)

*Primary Examiner* — Young T. Tse
(74) *Attorney, Agent, or Firm* — Jianq Chyun IP Office (57) ABSTRACT

A method for signal estimation and compensation and an apparatus using the same, adapted for estimating and compensating an imbalance effect between an in-phase path and a quadrature path of an Orthogonal Frequency Division Multiplexing (OFDM) communication system are provided. The method includes the following steps: receiving a signal, and using a plurality of symbols in a plurality of time frame to generate a plurality of balance coefficient groups, wherein every balance coefficient group includes a plurality of balance coefficient candidates; deriving a balance coefficient according to the balance coefficient set; and compensating the signal according to the balance coefficient.

12 Claims, 5 Drawing Sheets

(56) References Cited

OTHER PUBLICATIONS

Tsai et al., "Blind Frequency-Dependent I/Q Imbalance Compensation for Direct-Conversion Receivers," IEEE Transactions on Wireless Communications 9 (6), Jun. 2010, pp. 1976-1986.

Bhukania et al., "IQ Mismatch Compensation Using Time Domain Signal Processing: A Practical Approach," Proceedings of 2010 IEEE International Symposium on Circuits and Systems (ISCAS), May 30-Jun. 2, 2010, pp. 1021-1024.

* cited by examiner

METHOD FOR SIGNAL ESTIMATION AND COMPENSATION AND APPARATUS USING THE SAME

CROSS-REFERENCE TO RELATED APPLICATION

This application claims the priority benefit of Taiwan application serial no. 102118787, filed on May 28, 2013. The entirety of the above-mentioned patent application is hereby incorporated by reference herein and made a part of this specification.

TECHNICAL FIELD

The disclosure relates to a communication method and apparatus, and particularly relates to a method and apparatus for estimating and compensating an imbalance effect between an in-phase path and a quadrature path in an Orthogonal Frequency Division Multiplexing (OFDM) system.

BACKGROUND

In wireless communication systems, an IQ imbalance effect caused by imbalance in terms of phase and gain between an in-phase path (I path) and a quadrature path (Q path) of a receiving end is a common issue when radio frequency (RF) signals are received. The IQ imbalance effect results in image aliasing in an orthogonal frequency division multiplexing (OFDM) communication system, which may directly influence the received signal. In particular, when the receiving end is an apparatus with lower cost, such as a sensor node in machine-to-machine (M2M) communication, the influence becomes more significant.

Several solutions, as described below, are known to solve the IQ imbalance effect. One of the solutions is to insert a longer preamble or a pilot signal so that the characteristic of the IQ paths can be obtained by the receiver by using the longer preamble or the pilot signal. Such solution has a lower complexity, but however, different processes are required in correspondence to different standards, and the transmission rate of data is also influenced. Another solution is to perform blind estimation using a time domain signal that is received. Although such solution is applicable to all of the conventional standards, it takes longer time for convergence and requires a higher computational complexity. Still another is backtracking IQ path estimation, wherein an error factor is used to correct the compensation based on each outcome of compensation. However, such solution also takes a longer time for convergence. In the solutions above, issues of a lower data transmission rate or an overly high complexity usually come along with solving the imbalance effect. Thus, eliminating image aliasing to the received signal while paying attention to the hardware cost of a system as well as the computation complexity has become an important issue in the field.

SUMMARY

The disclosure provides a method and apparatus for estimation and compensation to eliminate an influence of an IQ imbalance effect in a signal using blind-estimation of a frequency domain signal.

The method for signal estimation and compensation of the disclosure is adapted for estimating and compensating an imbalance effect between an in-phase path and a quadrature path in an orthogonal frequency division multiplexing (OFDM) communication system. The method includes the following details. First, a frequency domain signal is received, wherein a plurality of symbols in a plurality of time frames in the frequency domain signal are used to generate a plurality of balance coefficient groups, and each of the balance coefficient groups includes a plurality of balance coefficient candidates. Then, a balance coefficient is obtained based on the balance coefficient groups. Afterwards, the frequency domain signal is compensated based on the balance coefficient.

The apparatus for signal estimation and compensation of the disclosure is adapted for estimating and compensating an imbalance effect between an in-phase path and a quadrature path in an orthogonal frequency division multiplexing communication system, and includes an estimator and a compensator. The estimator receives a frequency domain signal, and generates a plurality of balance coefficient groups by using a plurality of symbols in a plurality of time frames in the frequency domain signal are used to, wherein each of the balance coefficient groups includes a plurality of balance coefficient candidates, and the estimator obtains a balance coefficient based on the balance coefficient groups. The compensator is coupled to the estimator, compensates the frequency domain signal based on the balance coefficient.

Based on the above, the disclosure provides a method and apparatus for signal estimation and compensation, wherein a plurality of balance coefficient groups are generated from a plurality of symbols in a plurality of time frames in the frequency domain signal, and the balance coefficient for compensating the IQ imbalance effect is obtained from the balance coefficient candidates.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
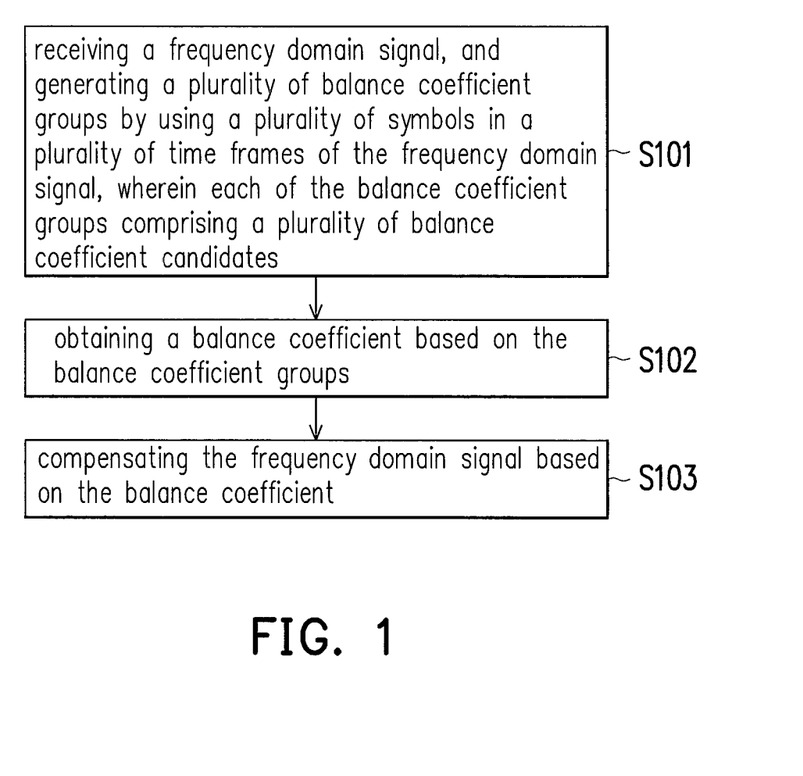
FIG. 1 is a flowchart of steps illustrating a method for signal estimation and compensation according to an embodiment of the disclosure.

FIG. 1 is a flowchart of steps illustrating a method for signal estimation and compensation according to an embodiment of the disclosure, wherein the method for signal estimation and compensation is adapted for estimating and compensating an imbalance effect between an in-phase (I) path and a quadrature (Q) path in an orthogonal frequency division multiplexing (OFDM) communication system. Referring to FIG. 1, a frequency domain signal is received firstly at step S101. A plurality of symbols in a plurality of time frames in the frequency domain signal are used to generate a plurality of balance coefficient groups, wherein each of the balance coefficient groups includes a plurality of balance coefficient candidates. Next, a balance coefficient is obtained based on the balance coefficient groups at step S102. Then, the frequency domain signal is compensated based on the balance coefficient at step S103.

Figure 2:
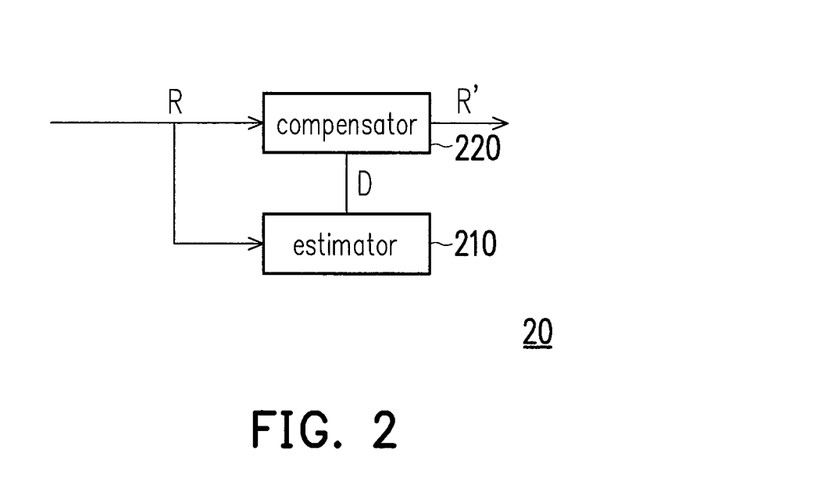
FIG. 2 is a functional block diagram illustrating an apparatus for signal estimation and compensation according to an embodiment of the disclosure.

In correspondence with FIG. 1, FIG. 2 is a functional block diagram illustrating an apparatus for signal estimation and compensation according to an embodiment of the disclosure, wherein the apparatus for signal estimation and compensation is adapted for estimating and compensating an imbalance effect between an in-phase path and a quadrature path in an OFDM communication system as well. Referring to FIG. 2, an apparatus for signal estimation and compensation 20 includes an estimator 210 and a compensator 220. The estimator 210 receives a frequency domain signal R. the estimator 210 generates a plurality of balance coefficient groups by using a plurality of symbols in a plurality of time frames in the frequency domain signal R, wherein each of the balance coefficient groups includes a plurality of balance coefficient candidates, and the estimator 210 obtains a balance coefficient D based on the balance coefficient groups. The compensator 220 is coupled to the estimator 210, compensates the frequency domain signal R according to the balance coefficient D and obtains a compensated frequency domain signal R'.

In the disclosure, the apparatus for signal estimation and compensation 20 may be realized by having a processor used with a memory unit to execute a certain program code. Alternatively, the apparatus for signal estimation and compensation 20 may also be realized in a form of system on-chip (SoC) and integrated with other circuits of a receiving end.

In the disclosure, the frequency domain signal R is a baseband frequency domain signal. A high frequency radio frequency signal is received by a receiving circuit (not shown), down-converted into a baseband time domain signal, and then converted through fast Fourier transformation (FFT), for example, and the baseband frequency domain signal is derived. In addition, the frequency domain signal R includes signals received from a plurality of sub-carriers. Herein, a signal R(k) received by a $k^{th}$ sub-carrier in the frequency domain signal R may be represented as a sum of a signal $I_{BB}(k)$ received via I path and a signal $I_{BB}(k)$ received via Q path, as shown below:

$$R(k) = I_{BB}(k) + jQ_{BB}(k) \quad (1)$$

Through deduction, formula (1) above could be re-written as:

$$R(k) = \alpha Z(k) + \beta Z^*(-k), \quad (2)$$

wherein $$\alpha = \frac{[1 + ge^{-j\theta}]}{2}, \beta = \frac{[1 - ge^{-j\theta}]}{2}$$

In formula (2), g represents a gain difference between the signal received via I path and the signal received via Q path, and θ is a phase difference between the signal received via I path and the signal received via Q path, and −k represents a sub-carrier at a mirror position of the $k^{th}$ sub-carrier. For example, given that a total number of the sub-carriers is 16, and the $k^{th}$ sub-carrier is the first sub-carrier, the $-k^{th}$ sub-carrier is the $16^{th}$ sub-carrier.

As shown in formula (2), Z(k), the first term of formula (2), is an ideal data to be received in the disclosure, and $\beta Z^*(-k)$, the second term, is an image aliasing in the received signal R(k) (aliasing from the $-k^{th}$ sub-carrier at the mirror position of the $k^{th}$ sub-carrier). Therefore, to estimate and compensate the image aliasing described above, the aliasing $Z^*(-k)$ needs to be eliminated or reduced to minimum.

Here, a definition of the balance coefficient D may be represented as follows:

$$D = \frac{\beta}{\alpha^*} \quad (3)$$

Namely, the above formula (s) defines a coefficient of proportion of the first and the second term of the signal R(k) in formula (2). When the balance coefficient D is obtained, the compensator 220 may further use the balance coefficient D to compensate the signal R(k). Through deduction, formula (3) above may be represented as follows:

$$D = \frac{\beta}{\alpha^*} = \frac{r_1(k)\frac{x_2(k)}{x_1(k)} - r_2(k)}{r_1^*(-k)\frac{x_2(k)}{x_1(k)} - r_2^*(-k)} \quad (4)$$

In formula (4), $r_1(k)$ is a first target symbol, and $r_2(k)$ is a second target symbol, whereas $r_1(-k)$ is a first mirror symbol, and $r_2(-k)$ is a second mirror symbol, wherein these symbols are symbols in the signal R(k), which are data that are already known when signal R(k) is received. $x_1(k)$ and $x_2(k)$ respectively represent ideal values of the first and second target symbols, which are data of the first and second target symbols transmitted at a transmitting end and are still unknown when signal R(k) is received. On the basis of formula (4), a relation between the target symbol and the mirror symbol and how to obtain the balance coefficient D by using formula (4) will be described below.

Figure 3A:
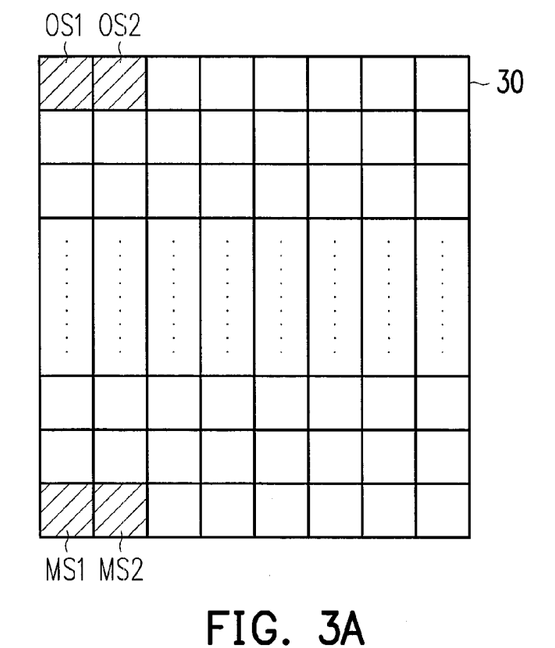
FIGS. 3A, 3B, and 3C are schematic views illustrating a relation of a target symbol and a mirror symbol corresponding to communication resource according to an embodiment of the disclosure.
Figure 3B:
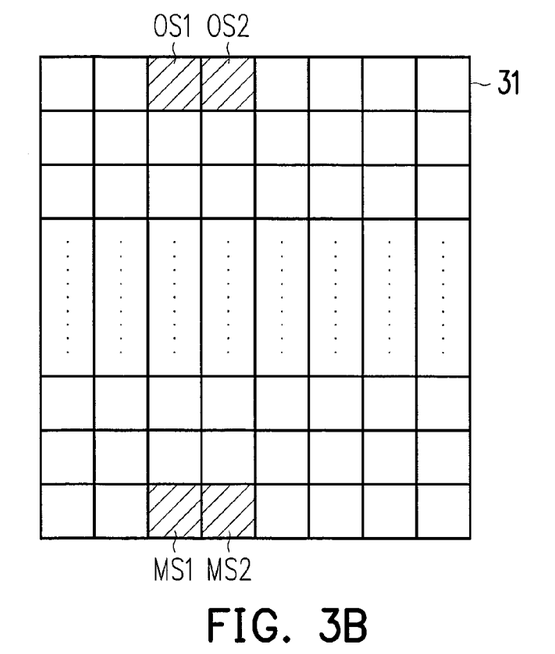
Figure 3C:
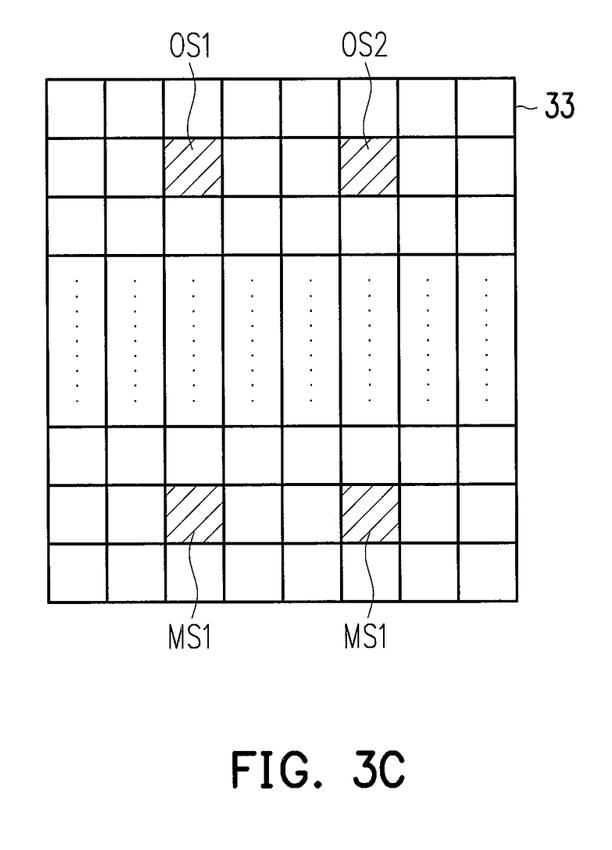

FIGS. 3A, 3B, and 3C are schematic views illustrating a relation of a target symbol and a mirror symbol corresponding to communication resource according to an embodiment of the disclosure. In FIGS. 3A to 3C, communication resources 30-32 correspond to the received signal R(k) described above. Also, in FIGS. 3A to 3C, a horizontal axis corresponds to time, and a vertical axis corresponds to the k sub-carrier of the received signal R(k). Each square in the communication resources 30-32 corresponds to a resource element on each of the sub-carriers in each time frame of the received signal R(k). In addition, a symbol may be carried on one resource element. Specifically, in the disclosure, a first target symbol OS1 may be a symbol carried by any one of the resource elements in the communication resource 30 (or communication resource 31 or 32).

As shown in FIGS. 3A to 3C, the first mirror symbol MS1 is located at the time frame same with the first target symbol OS1, but is a symbol carried by a resource element at a mirror position of the first target symbol OS1. The second target symbol OS2 is carried by a resource element located at the sub-carrier same with the first target symbol OS1 but in the time frame different from the first target symbol OS1. Similarly, the second mirror symbol MS2 is located at the time frame same with the second object symbol OS2, but carried by a resource element at the mirror position of the second mirror symbol MS2. Therefore, the first and second mirror symbols MS1 and MS2 also correspond to the same sub-carrier. Specifically, as shown in FIGS. 3A and 3B, the first and second target symbols OS1 and OS2 may be located at adjacent time frames. Alternatively, as shown in FIG. 3C, time frames that the first and second target symbols OS1 and OS2 respectively correspond to, may be intervened with a certain time frame interval and not adjacent. The disclosure is not limited thereto.

After setting the target symbols OS1 and OS2 and the mirror symbols MS1 and MS2 (carried by resource elements in the positions as shown in FIG. 3A, for example), by substituting all possible values of $x_1(k)$ and $x_2(k)$ in formula (4), a plurality of balance coefficient candidates d may be obtained. For example, given that the signal R(k) uses 16-QAM of quadrature amplitude modulation (QAM) as a modulation mechanism to modulate the symbols in signal R(k), each symbol has 16 possible values. Combining respective 16 possible value of $x_1(k)$ and $x_2(k)$, 256 of the balance coefficient candidates d may be obtained. The 256 balance coefficient candidates d together form a balance coefficient group $D_n$, which may be represented as below.

$$D_n = [x_{n,1}, x_{n,2}, x_{n,3}, \ldots x_{n,256}] \quad (5)$$

By respectively setting the target symbols OS1 and OS2 and the mirror symbols MS1 and MS2 at different positions, such as the positions shown in FIGS. 3A to 3C, n groups of the balance coefficient groups can be obtained. A preset value of n may be determined based on the actual condition in practice. The disclosure is not limited thereto.

Then, the correct balance coefficient D needs to be determined from the balance coefficient group $D_n$ above. A straightforward way to determine the balance coefficient D is to take an intersection of the n balance coefficient groups $D_n$ described above, when a result of intersection shows only one outcome (i.e. when the result of intersection shows that a number of element in the intersection is 1), it is determined that the only one outcome is the balance coefficient D. However, when ideal values of the fetched first target symbol and the second target symbol are identical (i.e. $x_1(k)$ and $x_2(k)$ are identical, and a ratio between $x_1(k)$ and $x_2(k)$ is 1), the outcome of intersection may become a null set, and a desired outcome thus fails to be obtained.

Therefore, in an embodiment of the disclosure, another calculation way is used to avoid the problem above. Namely, part or all of the balance coefficient group $D_n$ is chosen and the union of the chosen balance coefficient group $D_n$ is taken as a balance coefficient set. Then, the same manner is applied again with choosing different balance coefficient groups (part or all of the balance coefficient group $D_n$), thereby generating a preset number of balance coefficient sets, namely M balance coefficient sets $U_M$. Afterwards, an intersection of the M balance coefficient sets is taken, and the balance coefficient D is obtained thereby. For example, 14 balance coefficient groups are generated by the calculation steps described above (i.e. n=14), and the 14 balance coefficient groups are used to generate three balance coefficient sets (i.e. M=3). An example of embodying the balance coefficient set is provided as below:

$$U_1 = D_1 \cup D_2 \cup D_3 \cup D_4 \cup D_5$$

$$U_2 = D_6 \cup D_7 \cup D_8 \cup D_9 \cup D_{10}$$

$$U_3 = D_{11} \cup D_{12} \cup D_{13} \cup D_{14} \quad (6)$$

Thus, the balance coefficient D is:

$$D = U_1 \cap U_2 \cap U_3 \quad (7)$$

It should be noted that ways of generating the balance coefficient groups in the balance coefficient sets may not follow formula (6) only. The balance coefficient groups being chosen in one balance coefficient set may be also chosen by another balance coefficient set. In addition, the balance coefficient groups could be chosen randomly, or chosen by following a specific rule or order, but not limited thereto. When the number of element in an outcome set of formula (7) is 1, it is determined that the element is the balance coefficient D. The number of element in the outcome set being larger than 1 or the outcome set being a null set indicates that the outcome is not converged. And when the outcome is not converged, balance coefficient sets or balance coefficient groups may be added to take the intersection again and generate the outcome set. The embodiments below provide further details in this respect.

After the balance coefficient D is obtained according to formula (7), the balance coefficient D is transmitted to the compensator to compensate the frequency domain signal R (i.e. R(k)) based on the balance coefficient D. An ideal data Z(k) in the frequency domain signal R may be represented as the follows:

$$Z(k) = \frac{1}{G} R(k) - DR^*(-k), \quad (8)$$

wherein $$G = \alpha(1 - DD^*)$$

After substituting the balance coefficient D into formula (8), the ideal data Z(k) in the frequency domain signal R may be obtained. The method and apparatus for signal estimation and compensation of the disclosure may follow the processes shown in formulas (1) to (8) above to estimate and compensate the received frequency domain signal.

Figure 4:
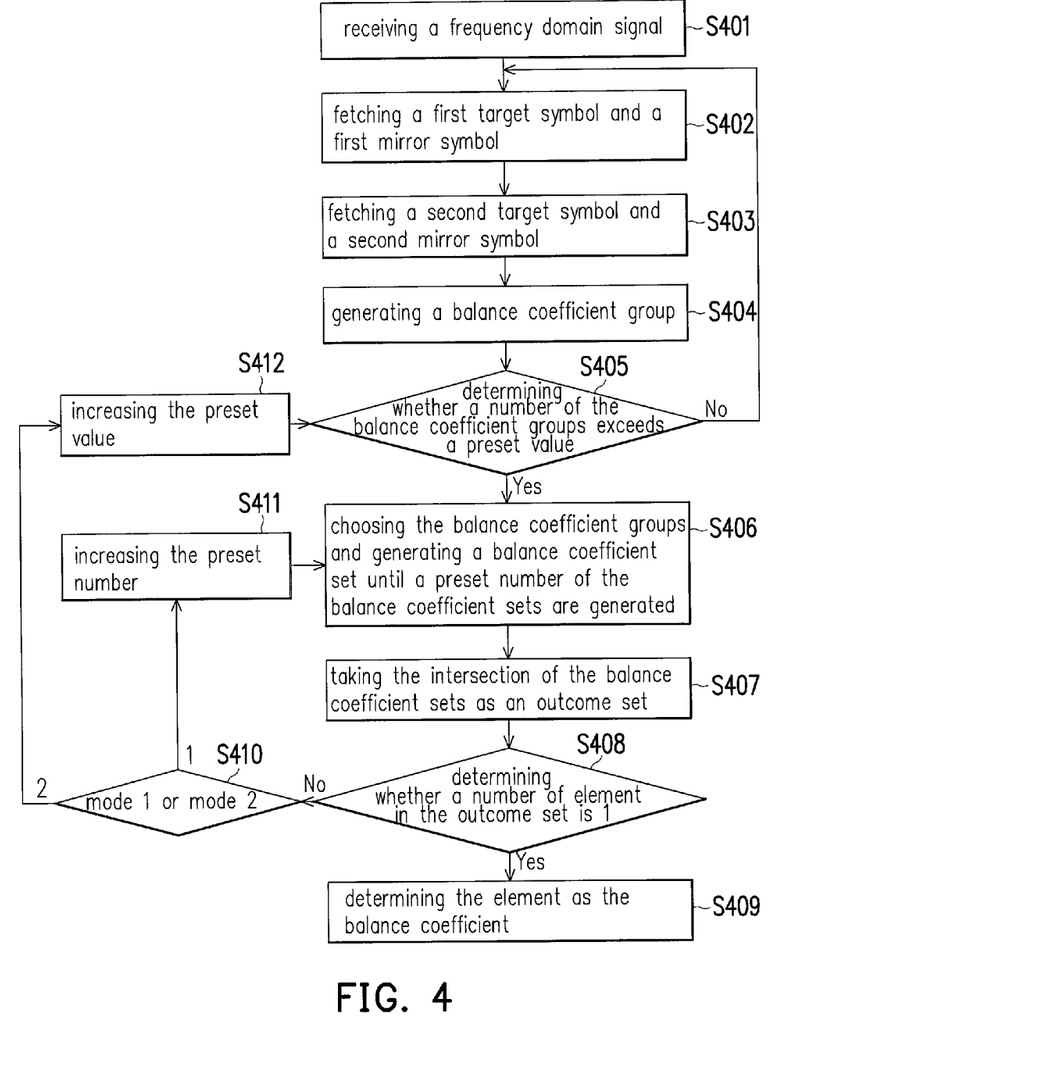
FIG. 4 is a flowchart of illustrating a method for signal estimation and compensation according to an embodiment of the disclosure.

FIG. 4 is a flowchart of illustrating a method for signal estimation and compensation according to an embodiment of the disclosure. Compared to FIG. 1, the embodiment shown in FIG. 4 provides a more detailed embodiment with respect to steps S101-S102, wherein steps S401-S404 correspond to step S101 shown in FIG. 1, and steps S405 to S412 correspond to step S102 shown in FIG. 1. Referring to FIG. 2 and FIG. 4, first, at step 401, the estimator 210 receives the frequency domain signal R, wherein the frequency domain signal R has a plurality of symbols in a plurality of time frames. Then, at steps 402 and 403, the estimator 210 fetches the first and second target symbols from the frequency domain signal R respectively as well as the corresponding first and second mirror symbols.

Then, at step 404, the estimator 210 may generate a plurality of balance coefficient groups according to the formulas (4) and (5) above and relevant descriptions. In addition, at step 405, whether the number of balance coefficient groups generated (i.e. the value n above) reaches the preset value is determined. If it is determined that the preset value is not reached, steps S402-S404 are performed repetitively to generate another balance coefficient groups until the number of the balance coefficient groups reaches the preset value. If it is determined that the preset value is reached, step S406 is performed.

At step S406, the estimator 210 chooses part or all of the balance coefficient groups, and the union the chosen balance coefficient groups is taken as the balance coefficient set (e.g. generating the balance coefficient set in the way shown in formula (7)). In addition, different parts of the balance coefficient groups are repetitively chosen and unions over the chosen balance coefficient groups are taken as the balance coefficient sets until the preset number of balance coefficient sets are generated. Then, at step 407, intersection of the preset number of balance coefficient sets (which generated at step 406) is taken as the outcome set. Afterwards, at step 408, whether the number of element in the outcome set is 1 is determined. When it is determined that the number of element in the outcome set is 1, the estimator 210 determines the element as the balance coefficient D and transmits the balance coefficient D to the compensator 220, such that the compensator 220 may make compensation according to the balance coefficient D.

However, when it is determined at step 408 that the number of element in the outcome set is not 1, the estimator 210 may generate the outcome set again in difference processes based on different modes being set. When the estimator 210 is set at mode 1 (step S410, mode 1), the estimator 210 increases the preset number of balance coefficient sets (step S411), such that additional balance coefficient sets (extended balance coefficient sets) would be generated at step S406. Then, intersection of these balance coefficient sets (the original balance coefficient sets and the extended balance coefficient sets) is taken to obtain the outcome set (step S407). In an embodiment of the disclosure, when the estimator 210 increases the preset number of balance coefficient sets, the balance coefficient groups included in the original balance coefficient sets could be further adjusted. However, the disclosure is not limited thereto.

When the estimator is set at mode 2 (step S410, mode 2), the estimator 210 increases the preset value of the balance coefficient groups (S412). Namely, the estimator 210 needs to repeat steps S402 to S405 to increase the fetched target symbols and mirror symbols, thereby obtaining additional balance coefficient groups (i.e., the extended balance coefficient groups). At step S406, the estimator 210 may use the original balance coefficient groups and the additional balance coefficient groups (i.e., the extended balance coefficient groups) to generate more balance coefficient sets and then obtain the outcome set by using these balance coefficient sets (step S407).

In an embodiment of the disclosure, target symbols and mirror symbols in a balance coefficient group (e.g., the first target and mirror symbols or the second target and mirror symbols) may be identical to a set of target and mirror symbols in another balance coefficient group, so as to reduce complexity of generating the balance coefficient groups. However, the two balance coefficient groups may not include two sets of target and mirror symbols that are completely identical (i.e., one set is the first target symbol and the first mirror symbol, and the other set is the second target symbol and the second mirror symbols).

Regarding setting of the mode of the estimator 210 (corresponding to step S410), the mode may be manually set in the estimator 210 in advance, or the mode may be chosen based on practical needs. For example, given a preset mode is mode 1, when mode 1 is executed for over a preset time value or the preset number is over a threshold, the estimator 210 may actively switch the mode to mode 2. However, the disclosure is not limited thereto.

Figure 5:
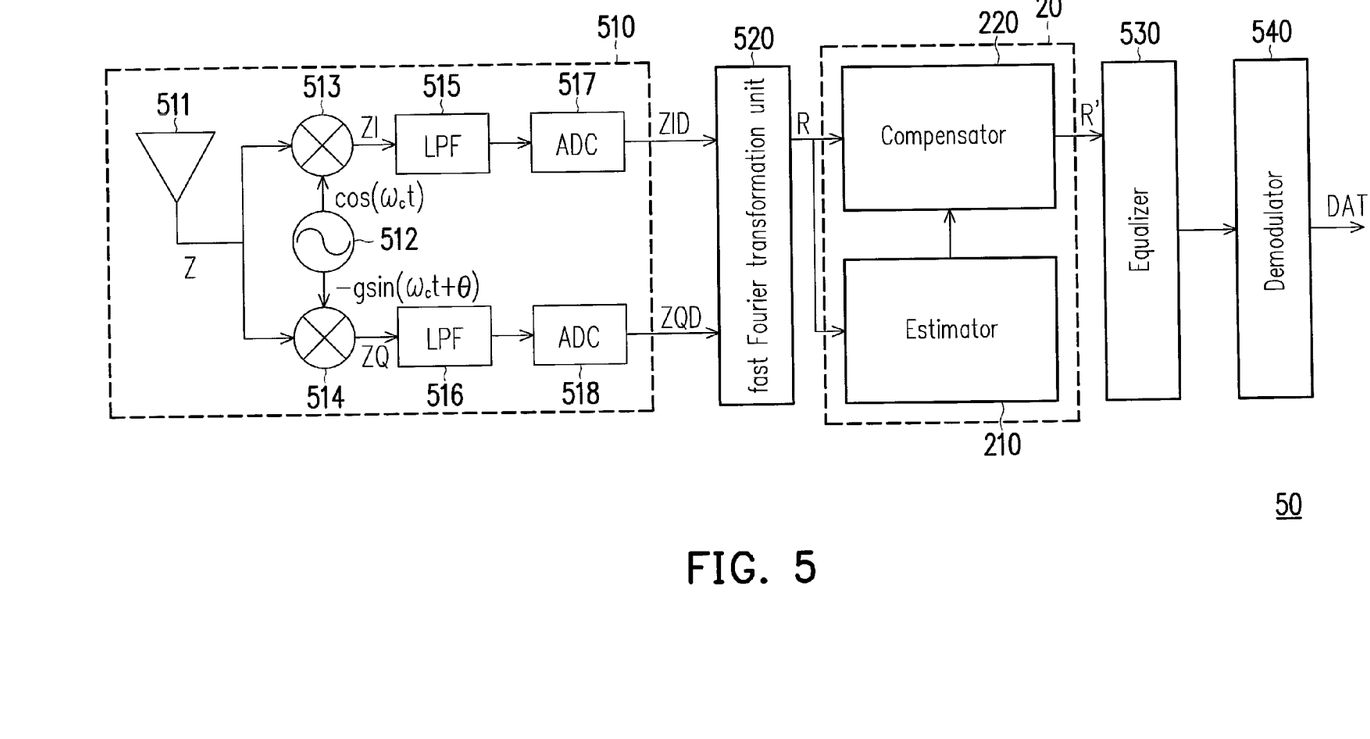
FIG. 5 is a functional block diagram illustrating a receiving end according to an embodiment of the disclosure.

Description regarding actual application of the apparatus and method for signal estimation and compensation of the disclosure in the receiving end of the OFDM communication system is provided below. FIG. 5 is a functional block diagram illustrating a receiving end according to an embodiment of the disclosure, wherein the receiving end shown in FIG. 5 includes the apparatus for signal estimation and compensation provided in this disclosure. Referring to FIG. 5, a receiving end 50 includes a front end circuit 510, a fast Fourier transformation (FFT) unit 520, the apparatus for signal estimation and compensation 20, an equalizer 530, and a demodulator 540. Specifically, the front end circuit 510 includes an antenna unit 511, a local oscillator 512, mixers 513-514, low pass filters (LPF) 515-516, and analog-to-digital converters (ADC) 517-518.

The antenna unit 511 may includes a single antenna or a plurality of antennas. The mixer 513 receives an analog time domain signal Z in the OFDM communication system from the antenna unit 511, mixes the analog time domain signal Z with a cosine wave (cos $\omega_c t$ as shown in FIG. 5) provided by the local oscillator 512 to obtain an analog time domain signal ZI of I path. The analog time domain signal ZI is then processed by the LPF 515 and the ADC 517 to become a digital time domain signal ZID of I path.

Besides, the mixer 513 receives the analog time domain signal Z in the OFDM communication system from the antenna unit 511, mixes the analog time domain signal Z with a sine wave ($-g \sin(\omega_c t + \theta)$ as shown in FIG. 5) provided by the local oscillator 512 to obtain an analog time domain signal ZQ of Q path. The analog time domain signal ZQ is then processed by the LPF 516 and the ADC 518 to become a digital time domain signal ZQD of Q path. $\theta$ in the sine wave is a phase difference from the cosine wave provided to the mixer 513 generated when the local oscillator 512 generates the sine wave. g is a gain difference from the cosine wave provided to the mixer 513 generated when the local oscillator 512 generates the sine wave. The phase difference $\theta$ and the gain difference g correspond to the gain difference g and the phase difference $\theta$ in formula (2), which is a crucial factor influencing imbalance of the IQ path.

The FFT unit 520 receives and transforms the digital time domain signal ZID of I path and the digital time domain signal ZQD of Q path into the frequency domain signal R, and transmits the frequency domain signal R to the apparatus for signal estimation and compensation 20. The apparatus for signal estimation and compensation 20 applies the contents (i.e., the calculation steps) described in the embodiments above to compensate the IQ imbalance effect in the frequency domain signal R, and generates the compensated frequency domain signal R' thereby. The compensated frequency domain signal R' is processed by the equalizer 530 and the demodulator 540, and then converted into a data DAT to be received by the receiving end 50.

Based on the above, the disclosure provides a method for signal estimation and compensation as well as an apparatus for signal estimation and compensation, which uses blind estimation to fetch an unknown data signal in symmetrical positions (i.e. the target and mirror symbols) in the frequency domain signal to estimate an IQ imbalance effect. A balance coefficient is generated by estimation as described above, and the balance coefficient could be used to compensate the frequency domain signal. With the method and apparatus for signal estimation and compensation of the disclosure, there is no need to additionally add any preamble or pilot signal in a transmitting signal in advance, thus a certain data transmission rate is maintained. Meanwhile, compared to the conventional compensation using blind estimation, the convergence time for obtaining the balance coefficient according to the method and apparatus for signal estimation and compensation in this disclosure is shorter, the computational complexity and a latency time for the receiving end to receive a signal is reduced thereby.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for signal estimation and compensation, adapted for estimating and compensating an imbalance effect between an in-phase path and a quadrature path in an orthogonal frequency division multiplexing communication system, comprising:
   (a) receiving a frequency domain signal and generating a plurality of balance coefficient groups by using a plurality of symbols in a plurality of time frames of the frequency domain signal, wherein each of the balance coefficient groups comprising a plurality of balance coefficient candidates;
   (b) obtaining a balance coefficient based on the balance coefficient groups; and
   (c) compensating the frequency domain signal based on the balance coefficient.

2. The method for signal estimation and compensation as claimed in claim 1, wherein the time frames comprise a first time frame and a second time frame, the frequency domain signal comprises k symbols corresponding to k sub-carriers in one of the time frames of the frequency domain signal, where k is an integer greater than or equal to 1, and (a) comprises:
   (a1) at the first time frame, fetching a first target symbol and a first mirror symbol from the k symbols, wherein a position of the sub-carrier corresponding to the first mirror symbol is located at a mirror position of the sub-carrier corresponding to the first target symbol;
   (a2) at the second time frame, fetching a second target symbol and a second mirror symbol, wherein the second target symbol and the first target symbol correspond to the same sub-carrier, and the second mirror symbol and the first mirror symbol correspond to the same sub-carrier;
   (a3) using the first target symbol, the second target symbol, the first mirror symbol, and the second mirror symbol to generate one of the balance coefficient groups according to a modulation mechanism; and
   (a4) changing the first time frame and the second time frame, and repeating (a1) to (a3) to obtain rest of the balance coefficient groups.

3. The method for signal estimation and compensation as claimed in claim 2, wherein:
   the modulation mechanism is a quadrature amplitude modulation (QAM); and
   a number of the balance coefficient candidates in each of the balance coefficient groups is positively correlated with a symbol rate of the modulation mechanism.

4. The method for signal estimation and compensation as claimed in claim 2, wherein (b) comprises:
   (b1) respectively choosing part or all of the balance coefficient groups, and respectively taking the unions of the chosen balance coefficient groups as a plurality of balance coefficient sets;
   (b2) taking the intersection of the balance coefficient sets as an outcome set; and
   (b3) when a number of element in the outcome set is 1, determining the element in the outcome set as the balance coefficient.

5. The method for signal estimation and compensation as claimed in claim 4, wherein (b3) further comprises:
   when the number of element in the outcome set is not equal to 1, repeating (b1) to obtain a plurality of extended balance coefficient sets; and after (b1), (b2) further comprises:
   taking the intersection of the balance coefficient sets and the extended balance coefficient sets as the outcome set.

6. The method for signal estimation and compensation as claimed in claim 4, wherein (b3) further comprises:
   when the number of element in the outcome set is not equal to 1, repeating to receive the frequency domain signal and generate the balance coefficient groups by using the symbols in the time frames in the frequency domain signal, so as to obtain a plurality of extended balance coefficient groups; and
   after receiving the frequency domain signal and generating the balance coefficient groups by using the symbols in the time frames in the frequency domain signal, (b1) further comprises:
   respectively choosing part or all of the balance coefficient groups and the extended balance coefficient groups, and taking the unions of the chosen balance coefficient groups and the extended balance coefficient groups as the balance coefficient sets.

7. An apparatus for signal estimation and compensation adapted for estimating and compensating an imbalance effect between an in-phase path and a quadrature path in an orthogonal frequency division multiplexing communication system, comprising:
   an estimator, receiving a frequency domain signal, and generating a plurality of balance coefficient groups by using a plurality of symbols in a plurality of time frames in the frequency domain signal, wherein each of the balance coefficient groups comprising a plurality of balance coefficient candidates, and the estimator obtaining a balance coefficient based on the balance coefficient groups; and
   a compensator, coupled to the estimator and compensating the frequency domain signal based on the balance coefficient.

8. The apparatus for signal estimation and compensation as claimed in claim 7, wherein the time frames comprise a first time frame and a second time frame, the frequency domain signal comprises k symbols corresponding to k sub-carriers in one of the time frames of the frequency domain signal, where k is an integer greater than or equal to 1, and the estimator using the symbols in the frequency domain signal to generate the balance coefficient groups comprises:
   (a1) at the first time frame, fetching a first target symbol and a first mirror symbol from the k symbols, wherein a position of the sub-carrier corresponding to the first mirror symbol is located at a minor position of the sub-carrier corresponding to the first target symbol;
   (a2) at the second time frame, fetching a second target symbol and a second mirror symbol, wherein the second target symbol and the first target symbol correspond to the same sub-carrier, and the second mirror symbol and the first mirror symbol correspond to the same sub-carrier;
   (a3) using the first target symbol, the second target symbol, the first mirror symbol, and the second mirror symbol to generate one of the balance coefficient groups according to a modulation mechanism; and
   (a4) changing the first time frame and the second time frame, and repeating (a1) to (a3) to obtain rest of the balance coefficient groups.

9. The apparatus for signal estimation and compensation as claimed in claim 8, wherein:
   the modulation mechanism is a quadrature amplitude modulation; and a number of the balance coefficient candidates in each of the balance coefficient groups is positively correlated with a symbol information magnitude of the modulation mechanism.

10. The apparatus for signal estimation and compensation as claimed in claim 8, wherein the estimator using the balance coefficient groups to obtain the balance coefficient comprises:
- (b1) respectively choosing part or all of the balance coefficient groups, and respectively taking the unions of the chosen balance coefficient groups as a plurality of balance coefficient sets;
- (b2) taking the intersection of the balance coefficient sets as an outcome set; and
- (b3) when a number of element in the outcome set is 1, determining the element in the outcome set as the balance coefficient.

11. The apparatus for signal estimation and compensation as claimed in claim 10, wherein (b3) further comprises:
when the number of element in the outcome set is not equal to 1, repeating (b1) to obtain a plurality of extended balance coefficient sets; and
after (b1), (b2) further comprises:
taking the intersection of the balance coefficient sets and the extended balance coefficient sets to obtain the outcome set.

12. The apparatus for signal estimation and compensation as claimed in claim 10, wherein (b3) further comprises:
when the number of element in the outcome set is not equal to 1, repeating to receive the frequency domain signal and generate the balance coefficient groups by using the symbols in the time frames in the frequency domain signal, so as to obtain a plurality of extended balance coefficient groups; and
after receiving the frequency domain signal and generating the balance coefficient groups by using the symbols in the time frames in the frequency domain signal, (b1) further comprises:
respectively choosing part or all of the balance coefficient groups and the extended balance coefficient groups, and taking the unions of the chosen balance coefficient groups and the extended balance coefficient groups as the balance coefficient sets.

\* \* \* \* \*